United States Patent
Sakurai et al.

(10) Patent No.: US 7,328,881 B2
(45) Date of Patent: Feb. 12, 2008

(54) EVACUATING VALVE

(75) Inventors: Toyonobu Sakurai, Ibaraki (JP); Masao Kajitani, Ibaraki (JP)

(73) Assignee: SMC Corporation, Chiyoda-ku, Tokyo (JP)

(*) Notice: Subject to any disclaimer, the term of this patent is extended or adjusted under 35 U.S.C. 154(b) by 3 days.

(21) Appl. No.: 10/886,286

(22) Filed: Jul. 7, 2004

(65) Prior Publication Data

US 2005/0006610 A1 Jan. 13, 2005

(30) Foreign Application Priority Data

Jul. 9, 2003 (JP) .............................. 2003-194455

(51) Int. Cl.
  *F16K 31/00* (2006.01)
(52) U.S. Cl. ..................... 251/63.6; 251/63.5
(58) Field of Classification Search ............... 251/63.6, 251/63.5
  See application file for complete search history.

(56) References Cited

U.S. PATENT DOCUMENTS

| 4,431,159 A | * | 2/1984 | Stubbs | ....................... 251/63.6 |
| 4,815,697 A | * | 3/1989 | Skoda | .......................... 251/68 |
| 6,478,043 B2 | * | 11/2002 | Ishigaki | ....................... 137/341 |
| 6,494,229 B2 | * | 12/2002 | Kajitani | ....................... 137/530 |
| 2002/0033461 A1 | * | 3/2002 | Kajitani | ....................... 251/63.6 |

FOREIGN PATENT DOCUMENTS

JP 9-137879 * 5/1997

* cited by examiner

*Primary Examiner*—John Rivell
*Assistant Examiner*—Andrew J. Rost
(74) *Attorney, Agent, or Firm*—Peter Ganjian

(57) ABSTRACT

An evacuating valve includes a chamber port structure to be connected to a vacuum vessel in which a plasma is produce to create a plasma atmosphere, a pump port structure to be connected to a vacuum pump; a valve casing defining a passage connecting the chamber port structure and the pump port structure, and a valve mechanism for opening and closing the chamber port structure. At least two expended parts are formed by expanding an end part of the inside surface of the chamber port structure, and the valve element has a large part capable of being pressed against the valve seat with the sealing member held between the large part and the valve seat, and at least two small parts capable of being fitted in the expanded parts of the chamber port structure.

1 Claim, 3 Drawing Sheets

FIG. 2
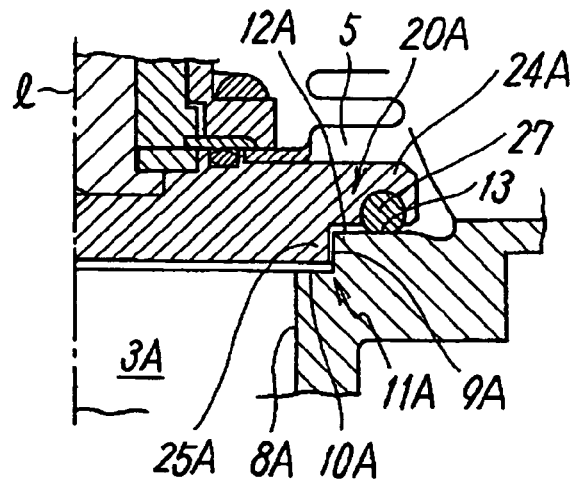
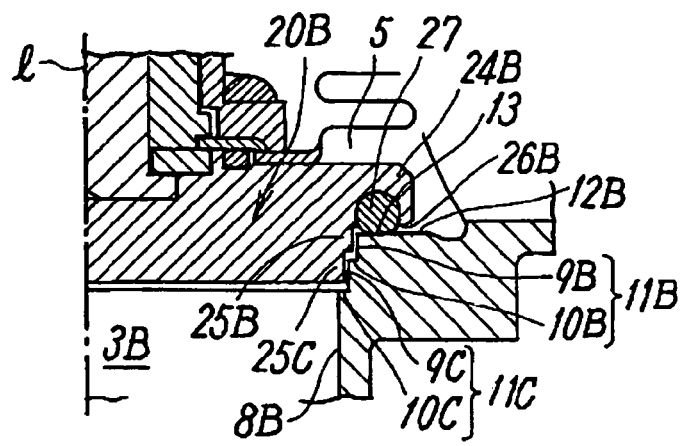
FIG. 3
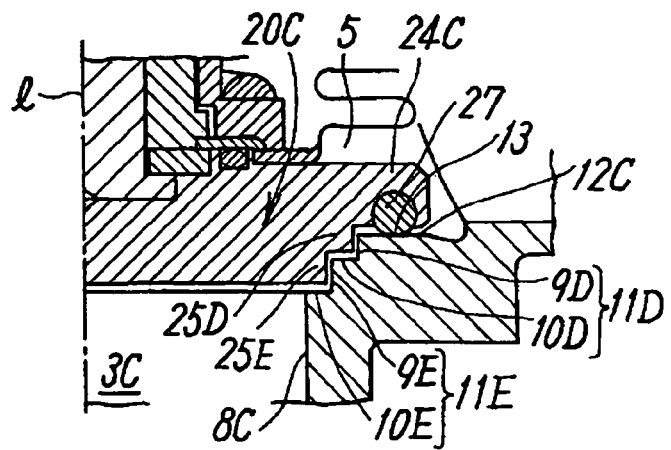
FIG. 4

EVACUATING VALVE

BACKGROUND OF THE INVENTION

1. Field of the Invention

The present invention relates to an evacuating valve attached to a vacuum vessel and connected to a vacuum pump for use in evacuating the vacuum vessel. More specifically, the present invention relates to an evacuating valve to be used in combination with a vacuum vessel in which an atmosphere of an ionized gas (hereinafter, referred to as "plasma atmosphere") is created.

2. Description of the Related Art

Referring to FIG. 5, a known evacuating valve 50 of this kind has a chamber port structure 52 to be connected to a vacuum vessel 51, a pump port structure 53 to be connected to a vacuum pump, and a valve mechanism 55 placed in a passage 54 between the chamber port structure 52 and the pump port structure 53. The valve mechanism 55 includes a valve seat 56 placed in the passage 54, a valve element 57 to be seated on the valve seat 56 to close the evacuating valve 50 and to be separated from the valve seat 56 to open the evacuating valve 50, and a sealing member 58 put on the valve element 57 to create a nonleaking union between the valve seat 56 and the valve element 57. The valve element 57 is separated from the valve seat 56 to evacuate the vacuum vessel 51. The valve element 57 is seated on the valve seat 56 to maintain a predetermined vacuum in the vacuum vessel 51.

Prior art relevant to the present invention is disclosed in, for example, JP-A No. 9-137879.

When the vacuum vessel 51 is used for a semiconductor device fabricating process, the vacuum vessel 51 is evacuated to a predetermined vacuum, and a plasma atmosphere is created in the vacuum vessel 51. As shown in FIG. 5, the valve element 57 of the known evacuating valve 50 has a substantially flat sealing surface 57a facing the chamber port structure 52, and the sealing member 58 is fitted in a circular groove formed in a peripheral part of the valve element 57. When the evacuating valve 50 is connected to the vacuum vessel 51 in which a plasma atmosphere is created, the chamber port structure is always open into the vacuum vessel 51, the chamber port structure 52 is filled up with the plasma and the sealing member 58 is always exposed to the plasma atmosphere. Consequently, the deterioration of the sealing member 58 of the valve mechanism is accelerated by the collision of active ionized molecules of gases against the sealing member 58, i.e., by plasma attack.

SUMMARY OF THE INVENTION

Accordingly, it is an object of the present invention to prevent the deterioration of a sealing member included in an evacuating valve to be connected to a vacuum vessel in which a plasma atmosphere is created by the collision of activated gas molecules against the sealing member as effectively as possible.

An evacuating valve according to the present invention includes: a chamber port structure to be connected to a vacuum vessel in which a plasma is produce to create a plasma atmosphere, a pump port structure to be connected to a vacuum pump, a valve casing defining a passage connecting the chamber port structure and the pump port structure, and a valve mechanism for opening and closing the chamber port structure, including a valve seat placed on an end surface, facing the passage, of the chamber port structure, a valve element capable of moving along an axis of the chamber port structure to close and open the chamber port structure, and a sealing member creating a nonleaking union between the valve seat and the valve element; wherein at least one expanded part is formed by expanding an end part, on the side of the passage, of an inside surface of the chamber port structure, and the valve element has a large part having a large diameter and capable of being pressed against the valve seat with the sealing member held between the large part and the valve seat, and a small part of a small diameter capable of being fitted in the expanded part of the chamber port structure.

The sealing member is fitted in a circular groove formed in the sealing surface of the large part of the valve element facing the vacuum vessel, and the number of the small parts of the valve element is equal to that of the expanded parts of the chamber port structure. The expanded part has a first surface substantially parallel to the axis of the chamber port structure, and a second surface substantially perpendicular to the axis of the chamber port structure.

When the valve element is seated on the valve seat to close the evacuating valve, the whole valve element may be on the side of the passage with respect to the second surface of the expanded part continuous with the inside surface of the chamber port structure. It is desirable that a clearance between the small part of the valve element and the second surface of the expanded part receiving the small part therein is wider than a clearance between the small part and the first surface of the expanded part.

BRIEF DESCRIPTION OF THE DRAWINGS

The above and other objects, features and advantages of the present invention will become more apparent from the following description taken in connection with the accompanying drawings, in which:

FIG. 2 is a sectional view of an essential part of an evacuating valve in a modification of the evacuating valve shown in FIG. 1;

FIG. 3 is sectional view of an evacuating valve in a second embodiment according to the present invention in a closed state;

FIG. 4 is a sectional view of an essential part of an evacuating valve in a modification of the evacuating valve shown in FIG. 3.

DESCRIPTION OF THE PREFERRED EMBODIMENTS

This invention will be described in further detail by way of example with reference to FIGS. 1 to 3. Terminology used for positional relationship explained below is for these drawings, unless otherwise noted.

Figure 1:
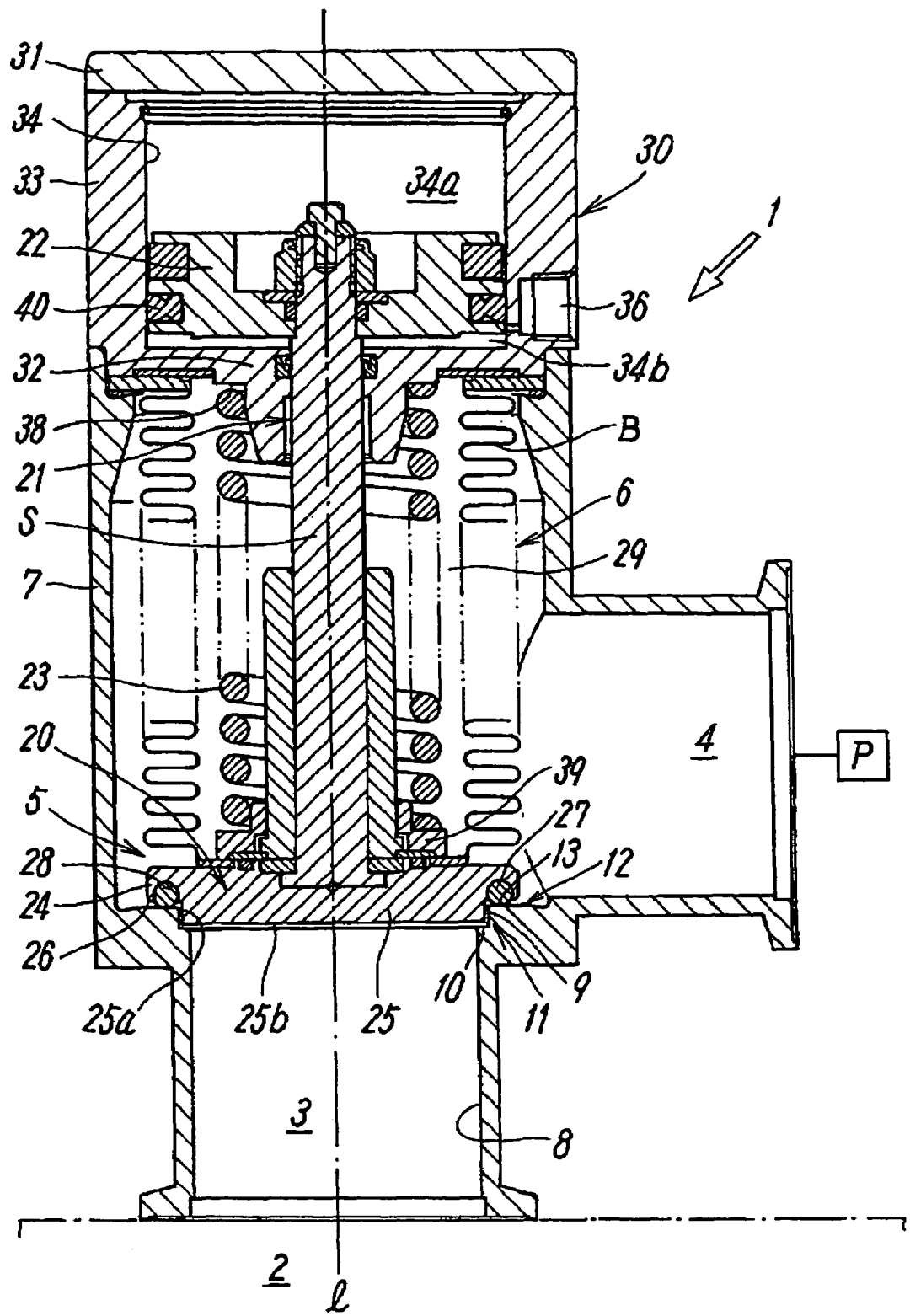
FIG. 1 is sectional view of an evacuating valve in a first embodiment according to the present invention in a closed state.

Referring to FIG. 1, an evacuating valve 1 in a first embodiment according to the present invention has a chamber port structure 3 to be directly connected to a vacuum vessel 2 in which a plasma atmosphere is created, and a pump port structure 4 to be connected to a vacuum pump P. The axis of the chamber port structure 3 is aligned with the axis 1 of the evacuating valve 1. The axis of the pump port structure 4 is perpendicular to the axis 1 of the evacuating valve 1 and the axis of the chamber port structure 3.

The chamber port structure 3 and the pump port structure 4 perpendicular to the former are connected by a passage 5.

A valve mechanism 6 connects the passage 5 to and disconnects the same from the chamber port structure 3. The chamber port structure 3 and the pump port structure 4 are connected to a substantially cylindrical valve casing 7, and the valve mechanism 6 is contained in the valve casing 7.

The valve mechanism 6 opens to connect the chamber port structure 3 to the passage 5 to evacuate the vacuum vessel 2 by the vacuum pump P. The valve mechanism 6 closes to disconnect the chamber port structure 3 from the passage 5 to maintain the vacuum vessel at a predetermined vacuum. When the evacuating valve 1 is applied to, for example, a semiconductor device fabricating process, a plasma is produced in the evacuated vacuum vessel 2.

The chamber port structure 3 has the shape of a cylinder having opposite open ends. One of the open ends of the chamber port structure is joined to the vacuum vessel 2 and the other open end is joined to the valve casing 7 and opens into the passage 5. An end part, on the side of the passage 5, of the inside surface 8 of the chamber port structure 3 is expanded to form an expanded part 11 continuous with the side surface 8 and terminates at an end surface 12, facing the passage 5, of the chamber port structure 3. The expanded part 11 has a first surface 9, i.e., a side surface, and a second surface 10 perpendicular to the first surface 9. The diameter of the first surface 9 is greater than that of the inside surface 8 of the chamber port structure 3. The first surface 9 is substantially parallel to the axis 1 and terminates at the end surface 12 of the chamber port structure 3. The second surface 10 is substantially perpendicular to the axis 1 and terminates at the inside surface 8 of the chamber port structure 3. The first surface 9 has a height greater than the width of the second surface 10. A valve seat 13 is formed in the end surface of the chamber port structure 3 so as to surround an opening formed in the end surface 12. Since the chamber port structure 3 is joined directly to the vacuum vessel 2 as shown in FIG. 1, the interior of the chamber port structure is exposed to the plasma atmosphere created in the vacuum vessel 2.

The pump port structure 4, similarly to the chamber port structure 3, has the shape of a cylinder having opposite open ends. One of the opposite open ends of the pump port structure 4 is connected to the vacuum pump P and the other open end opens into the passage 5. The pump port structure 4 communicates always with the passage 5. The vacuum pump P sucks a gas from vacuum vessel 2 through the chamber port structure 3, the passage 5 and the pump port structure 4.

The valve mechanism 6 includes the valve seat 13 formed in the end surface 12 of the chamber port structure 3, a valve element 20 capable of axially moving in opposite directions along the axis 1 of being seated on the valve seat 13 to close the evacuating valve 1 and of being separated from the valve seat 13 to open the evacuating valve 1, a sealing member 27 put on the valve element 20 to create a nonleaking union between the valve seat 13 and the valve element 20, a valve element operating unit 21 including a piston 22 connected by a shaft S having an axis aligned with the axis 1 to the valve element 20, and capable of driving the piston 22 to separate the valve element 20 from the valve seat 13, a return spring 23 urging the valve element 20 toward the valve seat 13, and a bellows B containing the return spring 23.

The valve element 20 is fastened to an end, on the side of the chamber port structure 3, of the shaft S. The valve element 20 has the shape of a stepped disk; the valve element 20 has a large part 24 of a large diameter to be seated on the valve seat 13 with the sealing member 27 held between the large part 24 and the valve seat 13 to close the evacuating valve 1, and a small part 25 of a small diameter to be fitted in the expanded part 11. The small part 25 has a side surface 25a, and a substantially flat end surface 25b serving as a valve surface. When the small part 25 is fitted in the expanded part 11, a predetermined clearance is formed around the side surface 25a of the small part 25, and the end surface 25b is seated on the bottom surface of the expanded part 11. The large part 24 of the valve element 20 has a contact surface 26 facing the end surface 12 of the chamber port structure 3 and surrounding the small part 25. An annular groove 28 is formed in the contact surface 26, facing the valve seat 13, of the large part 24. The sealing member 27 is fitted in the annular groove 28 so as to surround the small part 25. The sealing member 27 is an O ring formed of a synthetic rubber and having an inside diameter substantially equal to or slightly smaller than diameter of the first surface 9 of the expanded part 11.

When the valve element 20 is seated on the valve seat 13 with the small part 25 fitted in the expanded part 11, a clearance between the end surface 25b of the small part 25 and second surface 10 of the expanded part 10 is slightly wider than a clearance between the side surface 25a of the small part 25 and the first surface 9 of the expanded part 11 and is substantially equal to a clearance between the contact surface 26 of the large part 24 and the end surface 12 of the chamber port structure 3, i.e., the surface of the valve seat 13. Since the end surface 25b of the small part 25 is substantially flat, the whole valve element 20 is on the side of the passage 5 with respect to the second surface 10 of the expanded part 11 when the valve element 20 is seated on the valve seat 13.

The valve element operating unit 21 includes a cylinder 30 opposite the chamber port structure 3 of the evacuating valve 1, the piston 22 fitted in the cylinder 30, and the shaft S extended in the cylinder 30 and having the end attached to the piston 22. The cylinder 30 has a cylinder chamber 34 defined by a cap 31 forming a closed upper part of the cylinder 30, a partition wall 32 separating a lower part of the cylinder 30 from the passage 5, and a side wall 33. The piston 22 is slidably fitted in an airtight fashion in the cylinder chamber 34. The piston 22 divides the cylinder chamber 34 into an upper first pressure chamber 34a and a lower second pressure chamber 34b. The first pressure chamber 34a is always opened into the atmosphere through a breath hole, not shown. The second pressure chamber 34b is connected to a piston control port 36 formed in the side wall 32.

A through hole is formed in a central part of the partition wall 32, and the shaft S is passed through the through hole in an airtight fashion so as to be axially movable relative to the partition wall 32. A first spring seat 38 is formed on a surface, facing the passage 5, of the partition wall 32 so as to surround the through hole through which the shaft S is extended. The piston 22 is provided with a through hole capable of receiving the shaft S in an airtight fashion. An upper end part, as viewed in FIG. 1, of the shaft S is passed through the through hole of the piston 22, and the piston 22 is fastened to the upper end part of the shaft S. Annular grooves are formed in the outer side surface of the piston 22 and sealing rings 40 are fitted in the annular grooves.

The return spring 23 is a compression coil spring compressed between the first spring seat 38 of the partition wall 32, and a second spring seat 39 placed on the back surface of the valve element 20. The shaft S extends along the axis 1 through the return spring 23. The bellows B surrounds the return spring 23 and forms a spring chamber 29 to isolate the return spring 23 from the passage 5. The spring chamber 29 communicates with the atmosphere by means of a breathing hole, not shown.

When compressed air is supplied through the piston control port 36 into the second pressure chamber 34b, the piston 22 is moved upward in the cylinder chamber 34 against the resilience of the return spring 23 to separate the valve element 20 from the valve seat 13. When the supply of compressed air is stopped and the piston control port 36 is opened into the atmosphere, the piston 22 is moved downward by the resilience of the return spring 23 to press the valve element 20 and the sealing member 27 against the valve seat 13, so that the evacuating valve 1 is closed.

The shaft S connecting the piston 22 and the valve element 20 is formed in a length such that the valve element is spaced a maximum distance from the valve seat 13 when the piston 22 is moved up to its upper limit position, and the valve element 20 is perfectly pressed against the valve seat 13 when the piston 22 is moved down to its lower limit position.

The operation and effect of the evacuating valve 1 in the first embodiment will be described. While the vacuum vessel 2 is evacuated to a predetermined vacuum and a plasma is produced in the vacuum vessel 2 to create a plasma atmosphere in the vacuum vessel 2, the valve element 20 is seated on the valve seat 13 to disconnect the chamber port structure 3 from the passage 5 connected to the pump port structure 4, and the chamber port structure 3 is filled up with the plasma. In this state, the large part 24 of the valve element 20 presses the sealing member 27 against the valve seat 13 and the small part 25 of the valve element 20 is fitted in the expanded part 11 of the chamber port structure 3. Thus, the small part 25 protects the sealing member 27 from the plasma filling up the chamber port structure 3 and, consequently, the deterioration of the sealing member 27 due to the collision of the ionized molecules of the plasma against the sealing member 27 can be suppressed to the least possible extent.

Figure 5:
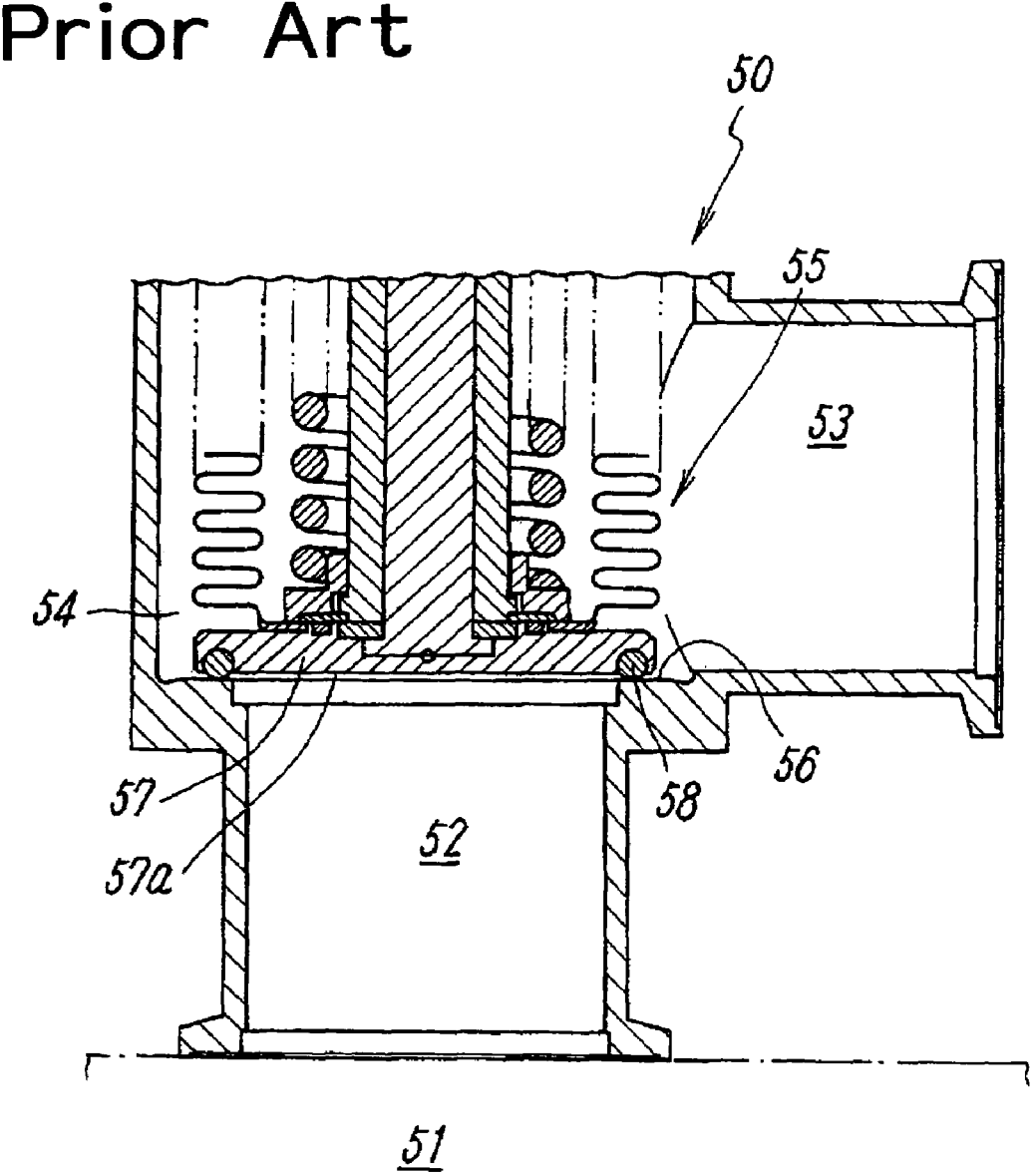
FIG. 5 is a sectional view of a prior art evacuating valve.

Whereas the sealing member 58 (FIG. 5) of the prior art evacuating valve 50 is exposed virtually to the plasma filling up the chamber port structure 52, a zigzag gap of a sufficient length is formed between the chamber port structure 3 filled up with the plasma and the sealing member 27 when the small part 25 is fitted in the expanded part 11, and the collision of the ionized molecules of the plasma against the sealing member 27 can be prevented as effectively as possible when the valve element 20 is seated on the valve seat 13. Thus, the deterioration of the sealing member 27 due to the collision of the ionized molecules of the plasma against the sealing member 27 can be suppressed to the least possible extent.

After the completion of a process using the plasma atmosphere created in the vacuum vessel 2, compressed air is supplied through the piston control port 36 of the cylinder 30 into the second pressure chamber 34b. Then, the piston 22 is moved up against the resilience of the return spring 23 to separate the valve element 20 from the valve seat 13. Consequently, the gas contained in the vacuum vessel 2 can be sucked by the vacuum pump P through the passage 5 and can be discharged from the pump port structure 4.

FIG. 2 shows an essential part of an evacuating valve in a modification of the evacuating valve shown in the first embodiment. Only matters related with the evacuating valve shown in FIG. 2 and different from those related with the evacuating valve 1 shown in FIG. 1 will be described and the description of the rest will be omitted to avoid duplication.

In the evacuating valve in this modification, a chamber port structure 3A has a wall of a thickness greater than that of the corresponding wall of the chamber port structure 3 shown in FIG. 1. Therefore, an expanded part 11A formed by expanding an end part, on the side of a passage 5, of the inside surface 8A of the chamber port structure 3A has a first surface 9A, and a second surface 10A of an increased width substantially equal to the height of the first surface 9A. A sealing member 27 has an inside diameter slightly greater than that of the first surface 9A of the expanded part 11A, and the distance between a valve seat 13 formed in the end surface 12A of the chamber port structure 3A, and the first surface 9A of the expanded part 11A is longer than the corresponding distance in the evacuating valve 1 shown in FIG. 1.

A valve element 20A, similarly to the valve element 20 shown in FIG. 1, has a large part 24A provided with an annular groove in which the sealing member 27 is fitted and to be pressed against the valve seat 13 so as to hold the sealing member 27 between the valve seat 13 and its surface facing the valve seat 13, and a small part 25A to be fitted in the expanded part 11A so as to form a clearance between the outside surface thereof and the side surface of the expanded part 11A.

When the valve element 20A is seated on the valve seat 13, the sealing member 27 can be spaced from the chamber port structure 3A filled with a plasma by a zigzag gap of a long length.

An evacuating valve 1 in a second embodiment according to the present invention will be described with reference to FIGS. 3 and 4.

FIG. 3 shows an essential part of the evacuating valve 1 in the second embodiment and FIG. 4 shows an essential part of an evacuating valve in a modification of the evacuating valve 1 shown in FIG. 3. Only matters related with the evacuating valve 1 shown in FIG. 3 and different from those related with the evacuating valve 1 shown in FIG. 1 will be described and the description of the rest will be omitted to avoid duplication.

Referring to FIG. 3, the evacuating valve 1 in the second embodiment has a chamber port structure 3B having a first expanded part 11B and a second expanded part 11C. The chamber port structure 3B and the expanded parts 11B and 11C have a common axis 1. The first expanded part 11B and the second expanded part 11C are formed by expanding parts of the inside surface 8B of the chamber port structure in steps in that order from an end surface 12B of the chamber port structure 3B. The expanded parts 11B and 11C have first surfaces 9B and 9C of the same height substantially parallel to the axis 1, and second surfaces 10B and 10C substantially perpendicular to the axis 1, respectively. The height of the first surfaces 9B and 9c is greater than the respective widths of the second surfaces 10B and 10C, The diameter of the first expanded part 11B is greater than that of the second expanded part 11C. The first surface 9B is joined to the end surface 12B of the chamber port structure 3B. The second expanded part 11C has a diameter greater than the inside diameter of the chamber port structure. The first surface 9C and the second surface 10C of the second expanded part 11C is joined to the second surface 10B of the first expanded part 11B and to the inside surface 8B, respectively.

A valve element 20B has the shape of a stepped disk having a large part 24B holding a sealing member 27 and to be pressed against the valve seat 13 so as to hold the sealing member 27 between the large part 24B and the valve seat 13, a first small part 25B protruding from the large part 24B, and a second small part 25C protruding from the first small part 25B. The first small part 25B has a diameter smaller than that of the large part 24B and is capable of being fitted in the first expanded part 11B so that a predetermined clearance is formed between the side surface of the first small part 25B and the first surface 9B of the first expanded part 11B. The second small part 25C has a diameter smaller than that of the first small part 25B and is capable of being fitted in the second expanded part 11C so that a predetermined clearance is formed between the side surface of the second small part 25C and the first surface 9C of the second expanded part 11C.

When the valve element 20B of the evacuating valve 1 in the second embodiment is seated on the valve seat 13, the whole valve element 20B is on the side of the passage 5 with respect to the second surface 10C of the second expanded part 11C connected to the inside surface 8B of the chamber port structure when the valve element 20B is seated on the valve seat 13.

When the valve element 20B is seated on the valve seat 13 with the small parts 25B and 25C fitted in the expanded parts 11B and 11C, respectively, the clearances formed respectively between the small part 25B and the second surface 10B of the first expanded part 11B and between the small part 25C and the second surface 10C of the second expanded part 11C are slightly greater than the clearances formed respectively between the side surface of the first small part 25B and the first surface 9B of the first expanded part 11B and between the side surface of the second small part 25C and the first surface 9C of the second expanded part 11C, and are substantially equal to the thickness of a gap between the contact surface 26B of the large part 24*b*, and the end surface 12B of the chamber port structure 3B, namely, the valve seat 13.

The inside diameter of the sealing member 27 is substantially equal to or slightly smaller than the diameter of the first expanded part 11B having the first surface 9B.

The two small parts 25B and 25C of the valve element 20B are fitted in the two expanded parts 11B and 11C, respectively, when the valve element 20B is seated on the valve seat 13. Thus, a zigzag gap of a length longer than that of the zigzag gap shown in FIG. 1 is formed between the chamber port structure 3B filled up with a plasma and the sealing member 27. Consequently, the sealing member 27 can be prevented more effectively from the plasma and hence the deterioration of the sealing member 27 due to the collision of the ionized molecules of the plasma against the sealing member 27 can be more effectively suppressed.

FIG. 4 shows an essential part of an evacuating valve 1 in a modification of the evacuating valve 1 in the second embodiment. Only matters related with the evacuating valve 1 shown in FIG. 4 and different from those related with the evacuating valves 1 shown in FIGS. 1 and 3 will be described and the description of the will be omitted to avoid duplication.

In the evacuating valve 1 in this modification, a chamber port structure 3C has a wall of a thickness greater than that of the corresponding wall of the chamber port structure 3B shown in FIG. 3. A first expanded part 11D is formed by expanding an end part, on the side of a passage 5, of the inside surface 8C of the chamber port structure 3C, and a second expanded part 11E is formed by expanding a part continuous with the first expanded part 11D. The expanded parts 11D and 11E have first surfaces 9D and 9E, and second surfaces 10D and 10E, respectively. The second surfaces 10D and 10E have increased widths approximately equal to the respective heights of the first surfaces 9D and 9E, respectively. A sealing member 27 has an inside diameter slightly greater than that of the first expanded part 11D, and the distance between a valve seat 13 formed in the end surface 12C of the chamber port structure 3C, and the first surface 9D of the expanded part 11D is longer than the corresponding distance in the evacuating valve 1 shown in FIG. 3.

A valve element 20C, similarly to that shown in FIG. 3, has the shape of a stepped disk having a large part 24C holding the sealing member 27 and to be pressed against the valve seat 13 so as to hold the sealing member 27 between the large part 24B and the valve seat 13, a first small part 25D protruding from the large part 24C and capable of being fitted in the first expanded part 11D so that a predetermined clearance is formed between the small part 25D and the surface of the first expanded part 11D, and a second small part 25E protruding from the first small part 25D and capable of being fitted in the second expanded part 11E so that a predetermined clearance is formed between the second small part 25E and the surface of the second expanded part 11E.

When the valve element 20C of the evacuating valve 1 in this modification is seated on the valve seat 13, with the small parts 25D and 25E fitted in the expanded parts 11D and 11E, respectively, a zigzag gap of a length longer than that of the zigzag gap shown in FIG. 3 is formed between the chamber port structure 3C filled up with a plasma and the sealing member 27.

Various changes and variations are possible in the foregoing evacuating vales according to the present invention without departing from the scope of the present invention. The sealing member may be held on the valve seat instead of on the valve element. An evacuating valve may include a chamber port structure provided with any suitable number of expanded parts not equal to those of the expanded parts of the foregoing evacuating valves, and a valve element provided with stepped parts respectively corresponding to the expanded parts and having shapes respectively complementary to those of the expanded parts of the chamber port structure.

The expanded parts and the valve element may be formed in any suitable dimensions. For example, an expanded part may have a first surface and a second surface, and the width of the second surface may be greater than the height of the first surface. The thickness f the clearance between the small part of the valve element and the second surface of the corresponding expanded part may be equal to or smaller than the thickness of the clearance between the side surface of the small part and the first surface of the expanded part and may be greater than the thickness of the gap between the contact surface of the large part and the valve seat. In a chamber port structure provided with a plurality of expanded parts, the first surfaces of the expanded parts may be different from each other in height or the second surfaces of the expanded parts may be different from each other in width.

As apparent from the foregoing description, the evacuating valve of the present invention includes the valve element having the small part that is fitted in the expanded part, on the side of the passage, of the chamber port structure when the valve element is seated on the valve seat. Thus, the sealing member that creates a nonleaking union between the valve seat and the valve element can be protected from the plasma produced in the vacuum vessel, the deterioration of the sealing member can be suppressed to the least possible extent, and the life of the sealing member can be extended.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An evacuating valve, comprising:
   a chamber port structure for connection with a vacuum vessel within which a plasma is produced to create a plasma atmosphere;
   the chamber port structure having at least two expanded parts that are configured as steps, formed from expanding an end part of an inside upper surface of the chamber port structure;
   a pump port structure for connection with a vacuum pump;
   a valve casing defining a passage connecting the chamber port structure and the pump port structure;
   a valve mechanism for opening and closing the chamber port structure, including a valve seat on an end surface of the chamber port structure that faces the passage;
   a valve element that is substantially configured as multi-stepped disk, moving along an axis of the chamber port structure for opening and closing the chamber port structure, the valve element comprising:
   a large part that forms a first section of the multi-stepped disk having substantially non-tapered, straight lateral and horizontal surfaces;
   the large part is pressed against the valve seat when the valve element is in a closed position, with a sealing member held between the large part and the valve seat for creating a non-leaking union between the valve seat and the valve element;
   at least two small parts that form a second section of the multi-stepped disk, having substantially non-tapered, straight lateral and horizontal surfaces that commensurately fit within the at least two expanded parts of the chamber port structure that form the steps; and
   a substantially non-tapered, straight, and flat bottom surface that faces the chamber port structure;
   the non-tapered, straight surfaces of the valve element that form the multi-stepped disk isolate the sealing member within the passage from the plasma atmosphere within the chamber port structure, preventing a deterioration of the sealing member by the plasma atmosphere;
   the number of the small parts of the valve element is equal to that of the expanded parts of the chamber port structure, with each of the expanded parts having a first surface substantially parallel to the axis of the chamber port structure, and a second surface substantially perpendicular to the axis of the chamber port structure, with the entire valve element on the side of the passage with respect to the second surface of the expanded part directly continuous with the inside surface of the chamber port structure when the valve element is seated on the valve seat to close the evacuating valve.

* * * * *